(12) United States Patent
Sharma et al.

(10) Patent No.: US 10,983,981 B1
(45) Date of Patent: Apr. 20, 2021

(54) ACID TRANSACTION FOR DISTRIBUTED, VERSIONED KEY-VALUE DATABASES

(71) Applicant: Amazon Technologies, Inc., Seattle, WA (US)

(72) Inventors: Vaibhav Sharma, Kirkland, WA (US); Nitin Kumar Gupta, Seattle, WA (US); Marvin Michael Theimer, Seattle, WA (US); Shen Pan, Bellevue, WA (US); Léon Thrane, Issaquah, WA (US); Zachary Thomas Crowell, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 14/559,324

(22) Filed: Dec. 3, 2014

(51) Int. Cl.
*G06F 16/23* (2019.01)
*G06F 16/22* (2019.01)

(52) U.S. Cl.
CPC .......... *G06F 16/2365* (2019.01); *G06F 16/22* (2019.01)

(58) Field of Classification Search
CPC ...................... G06F 17/30371; G06F 17/30312
See application file for complete search history.

(56) References Cited

U.S. PATENT DOCUMENTS

| | | | | |
|---|---|---|---|---|
| 7,519,865 B1 * | 4/2009 | Maly | ...................... | G06F 11/261 714/33 |
| 2012/0023506 A1 * | 1/2012 | Maeckel | ................. | G06F 9/485 719/318 |
| 2013/0036136 A1 * | 2/2013 | Horii | ....................... | G06F 9/466 707/770 |
| 2013/0066949 A1 * | 3/2013 | Colrain | ................... | G06F 9/466 709/203 |
| 2013/0311622 A1 * | 11/2013 | Das Gupta | .............. | G06F 9/466 709/221 |
| 2014/0330767 A1 * | 11/2014 | Fowler | .................... | G06F 9/466 707/607 |
| 2014/0365428 A1 * | 12/2014 | Snaman, Jr. | ...... | G06F 17/30365 707/609 |

OTHER PUBLICATIONS

"Multiversion concurrency control"; http://en.wikipedia.org/wiki/Multiversionconcurrencycontrol; accessed Aug. 19, 2014; 4 pages.
"Transaction Time"; http://en.wikipedia.org/wiki/Transaction_time; accessed Dec. 23, 2014, 1 page.

* cited by examiner

*Primary Examiner* — Ashish Thomas
*Assistant Examiner* — Dustin D Eyers
(74) *Attorney, Agent, or Firm* — Davis Wright Tremaine LLP

(57) ABSTRACT

A distributed key-value database management system may provide transactions having a high degree of conformance to ACID properties. A data element may be maintained as a versioned list, where each entry may comprise a timestamp and a value indicative of a corresponding version of the data element. The timestamp may be based at least in part on a vended time value. Timestamps may be monotonically increasing and unique across all entries in a distributed system. Conflicting updates to a data element may be detected directly, prior to the completion of involved transactions.

20 Claims, 10 Drawing Sheets

US 10,983,981 B1

ACID TRANSACTION FOR DISTRIBUTED, VERSIONED KEY-VALUE DATABASES

BACKGROUND

As compared to traditional relational database management systems, distributed database systems organized by key-value pairs may offer various beneficial characteristics such as improved scalability. However, these types of distributed database systems typically do not provide full support for the transactional characteristics of atomicity, consistency, isolation, and durability ("ACID"). As a result, distributed key-value database systems may not be well suited for applications in which a high degree of conformance to ACID properties is desired.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Embodiments of the present disclosure may involve a distributed key-value database system having a high degree of conformance to ACID properties. ACID properties may be described as characteristics of a transaction that help to ensure that a transaction is reliably processed. Atomicity refers to a characteristic in which either all changes pertaining to a particular transaction are committed (or in other words, made permanent), or none are. Distributed key-value database systems typically provide atomicity for updates to individual key-value pairs, but not for updates that span multiple key-value pairs. Consistency refers to a characteristic in which stored data conforms to any applicable rules, such as various constraints that may be applied to the data being maintained. Isolation refers to the degree to in which transactions operating concurrently have the potential to interfere with each other. Traditional relational database systems may provide a high degree of isolation. However, conventional distributed key-value database systems may not provide sufficient isolation. Durability refers to a characteristic in which changes made to data are resistant to loss due to factors such as system failure.

Figure 1:
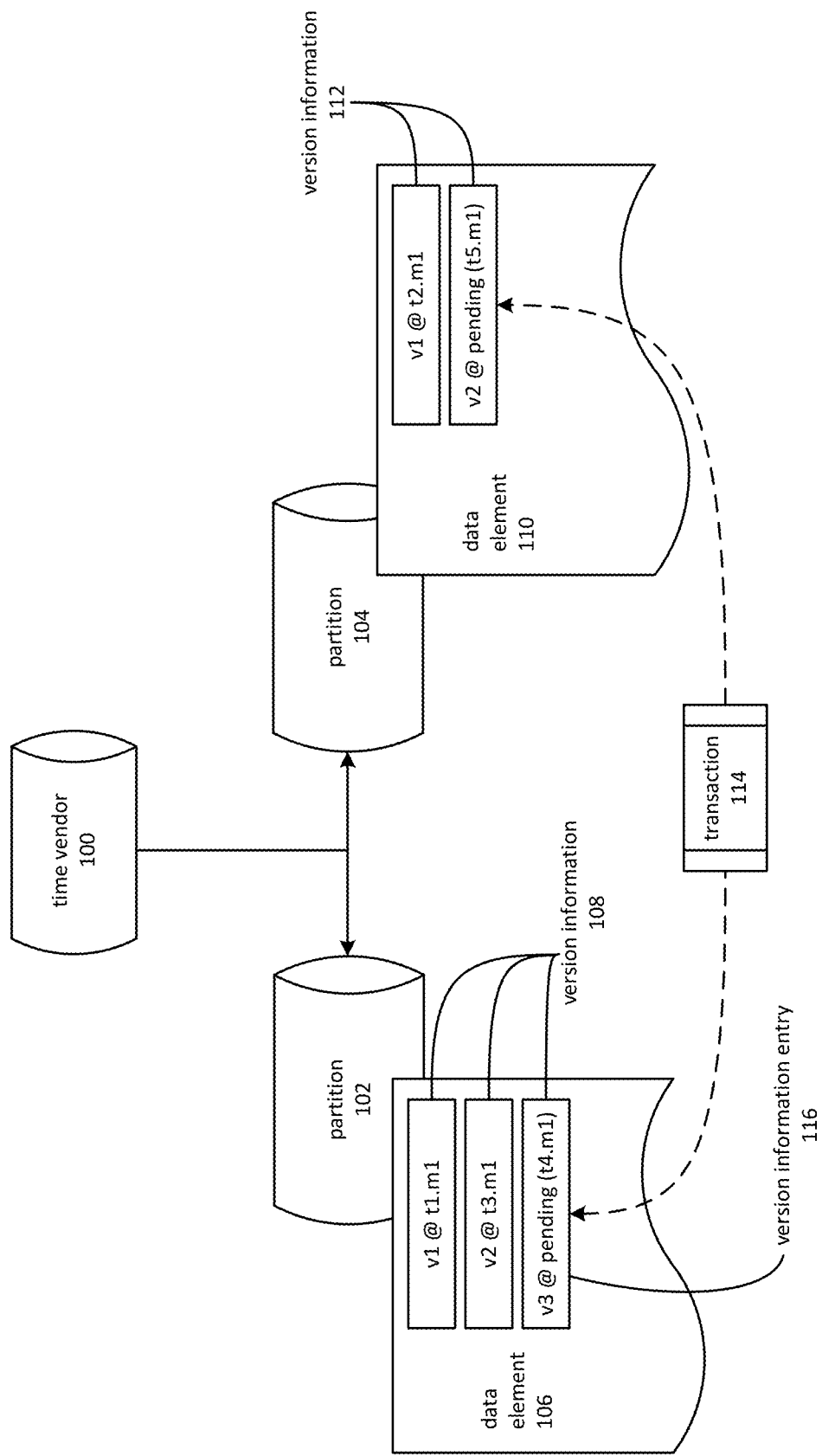
FIG. 1 is a block diagram depicting an embodiment of a distributed key-value database system employing a centralized time vending mechanism and data element versioning to achieve ACID properties.

FIG. 1 is a block diagram depicting an embodiment of a distributed key-value database system employing a centralized time vending mechanism and data element versioning to achieve ACID properties. A distributed key-value database system may comprise a number of computing nodes, each of which may host one or more table partitions. For example, in FIG. 1 partition 102 could host a first portion of a horizontally partitioned table, and partition 104 could host a second portion of the horizontally partitioned table. As used herein, the term table may be used to refer to various types of collections of data. These types may include structured collections of data such as relational database tables, semi-structured collections of data such as key-value pairs, object hierarchies, document collections, and so on, and unstructured data collections.

Partitions in a distributed key-value database system may maintain data elements, such as the data elements 106 and 110 depicted in FIG. 1. As used herein, the term data element may refer to a wide variety of data representations. Non-limiting examples include data columns or data rows maintained on a storage device such as a solid-state drive or in main system memory. Another non-limiting example includes a key-value pair or a key-value collection.

Embodiments may maintain a history of version information 108 and 112. Partition 102, for example, may maintain version information 108 for data element 106, and partition 104 may maintain version information 112 for data element 110. Version information may comprise a history of changes made to a data element sufficient to retrieve or reconstruct a value of a data element at a point in time. Each version may correspond to a change made to the data element. Embodiments may maintain version information for a given data element indefinitely, for some number of versions below a threshold value, for a given timespan and so forth.

As depicted in FIG. 1, data element 106 may comprise version information 108, which may in turn comprise a vector, list, or other structure maintaining a history of changes made to data element 106. These changes are depicted as "v1," "v2," and "v3." Version information 108 may also comprise information indicating when the change was committed. For example, in version information 108 "v1" is depicted as having been committed at timestamp "t1.m1" and "v2" as committed at "t3.m1." The list may include changes made as part of a transaction 114 that has not yet terminated, which may be described as pending changes. FIG. 1 depicts version information 108 have a change "v3" that is still pending. Embodiments may, prior to commit, index version information entries that correspond to pending versions, such as version information entry 116. Embodiments may store the start time of the pending transaction within version information entry 116, e.g., "t4.m1."

A transaction 114 may refer to a series of related changes made to one or more data elements. In the example depicted by FIG. 1, transaction 114 may include a change to data element 106 (depicted as "v3" of version information 108) and a change to data element 110 (depicted as "v2" of version information 112). Embodiments may record pending changes to a data element in the version information corresponding to the data element. A transaction 114 may be committed or rolled back. If committed, pending changes recorded in version information 108 and version information 112 may be marked as committed. Embodiments may, for example, record the time at which the change was committed and remove indications that the changes pending to data elements 106 and 110 were pending. If transaction 114 is rolled back, the pending versions of data elements 106 and 110 may be removed or cancelled.

Embodiments may achieve ACID properties for transaction through use of centralized time vendor 100. Embodiments may record changes made to data elements 106 and 110 by maintaining version information 108 and 112, respectively, including time of commit information obtained at least in part from time vendor 100. Embodiments may also mark pending changes to include time information obtained from time vendor 100.

A time vendor 100 may output monotonically increasing values that are indicative of time. Embodiments may cause each vended time values to be unique and monotonically increasing system-wide. For example, the time values "t1" and "t3" depicted in version information 108 could be used, in some embodiments, exactly once across partitions 102 and 104. Similarly, time "t2" could be used exactly once between the two partitions 102 and 104. Other embodiments may allow vended time values to be reused. In such cases, one or more additional values may be combined with a vended time value to form an identifier that is indicative of time and monotonically increasing. This value may be referred to as a timestamp. For example, in FIG. 1 time value "t1," as depicted in version information 108, might be reused elsewhere but combined with one or more additional values to ensure uniqueness. The value "m1" (depicted as part of version information 108 and combined with "t1") could be incremented once for each time it is used, producing a timestamp with the form "t1.m1." This format of a timestamp is intended to be illustrative, and many other alternative structures may be employed to store timestamp representations. In another aspect of an embodiment, a value indicative of time may be provided by time vendor 100 and combined with a multipart value, which could include a partition identifier and a monotonically increasing serial number. Embodiments may utilize approaches of this nature in order to provide degrees of conformance to ACID transaction properties. Conformance of the time values recorded with each version of a data element may correspond to the degree of isolation provided. Strict conformance to system-wide uniqueness and monotonicity may provide close to full isolation. However, in various cases and embodiments, a level close to full isolation, sometimes referred to as a serializable level of isolation, may not be required and increased throughput, efficiency or other factors may indicate that a less strict form of time-vending is required. Embodiments may achieve a serializable level of isolation by tracking read operations. For example, embodiments may record a version of data element, including its value, corresponding to a specific read operation, or maintain an in-memory cache comprising version information for the data element, and its corresponding value.

Figure 2:
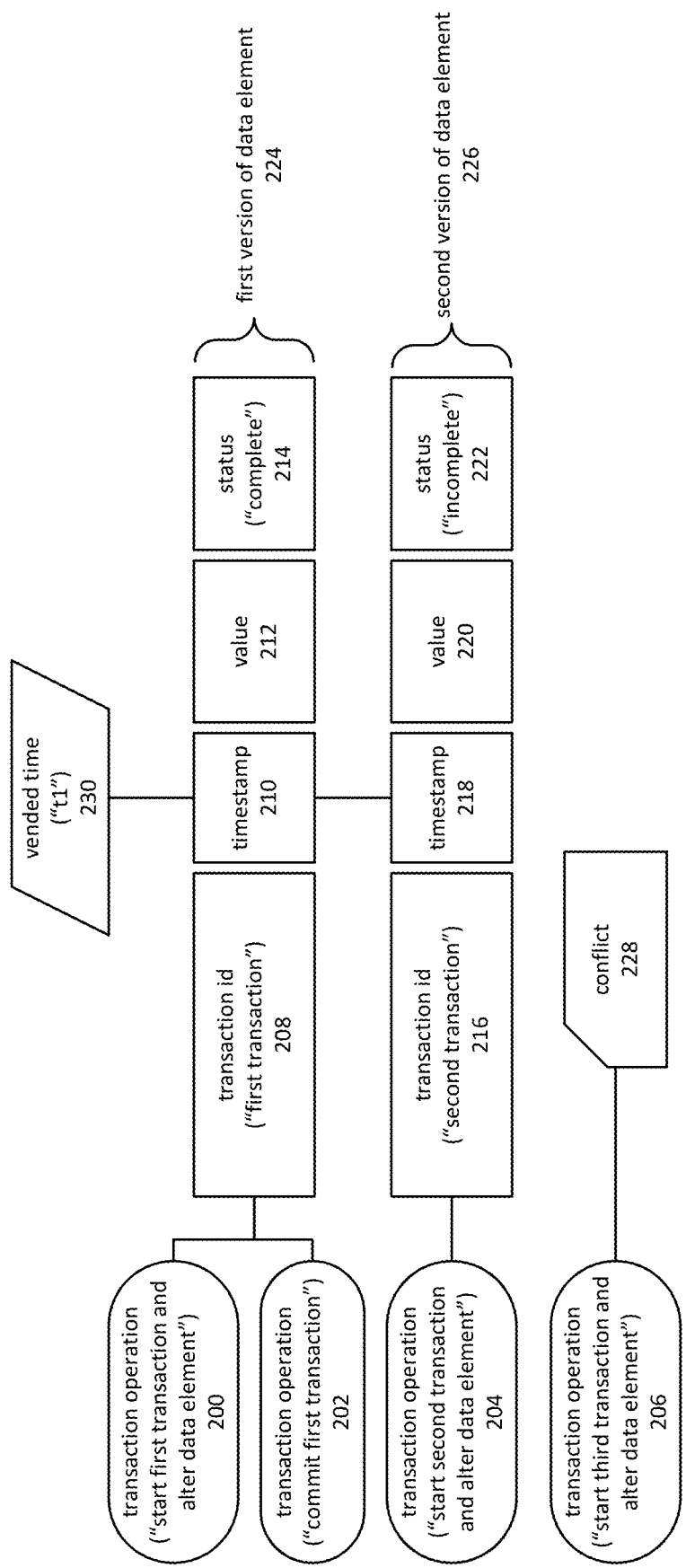
FIG. 2 is a block diagram depicting an embodiment of a system and process for maintaining a level of conformance to ACID transaction properties using versioned data elements and globally vended time.

FIG. 2 is a block diagram depicting an embodiment of a system and process for maintaining a level of conformance to ACID transaction properties using versioned data elements and globally vended time values. FIG. 2 depicts a series of operations performed in the context of various transactions. A transaction may group a set of related operations and permit the set of operations to be committed or rolled back as a group, so that the system provides assurances that either all operations in the set are performed, or that no operations in the set are performed.

The transaction operations 200-206 depicted in FIG. 2 may, for illustrative purposes, be assumed to involve modifying the same data element. In such cases, a possibility for conflicts exists because changes made to the same data element may be incompatible.

Operations to modify a data element may be coincident with starting a transaction, or may be performed as separate operations prior to committing a transaction. For simplicity in representation, FIG. 2 depicts starting a transaction and modifying a data element as a single operation. In various cases and embodiments, transactions may be initiated in an operation separate from a series of one or more operations to create, modify, or delete data elements.

A transaction operation 200 may involve starting a first transaction and altering a data element. Additional operations may be associated with the first transaction, but are not depicted in FIG. 2 for simplicity of representation. Altering a data element may comprise adding an entry to a series of entries describing various versions of a data element. In the example depicted by FIG. 2, transaction operation 200 may be assumed (for illustrative purposes) to correspond to setting the initial value of the data element, or in other words the first version. Upon initiation of the transaction and setting the initial value, entries in a data structure may be set to describe values for the first version of the data element, and other data portions indicative of the state of the transaction. Prior to committing the transaction initiated in transaction operation 200, a first version of the data element 224 may comprise a transaction id 208, a timestamp 210, a value 212, and a status 214 indicating that the transaction has not yet been committed. However, after transaction operation 202 ("commit first transaction") 202 is completed, status 214 may be set to indicate that the transaction is complete. Accordingly, in FIG. 2 status 214 is depicted as showing a complete state for the first transaction.

In some embodiments, timestamp 210 may be set prior to completion of the transaction. Embodiments may use the timestamp value to apply various mechanisms for performing error detection and correction. For example, cyclic dependencies or transaction timeouts may be detected, in some embodiments, by using the timestamp value. Embodiments may set a timeout value based on a maximum length of time that a cyclic dependency, or other cause of a non-terminating transaction, should go unresolved.

A value used for timestamp 210 may be based on a vended time 230. A vended time 230 may be obtained from a server process configured so as to provide time information that may be used to form a value for timestamp 210. In various embodiments, a vended time value 230 may be combined with an addition value or values to ensure monotonicity. The additional value or values may be provided by a time vending process. The additional value or values may also be provided by another process, such as one operating on a local partition.

In an embodiment, a timeout process may be used in various scenarios such as when a participant in a transaction unexpectedly terminates, or when there is a deadlock scenario. For example, a deadlock case may arise where embodiments permit only one active lock or uncommitted version to apply to a given data element. It may be the case that two transactions each need to access a version of a data element locked by the other transaction, which may result in a deadlock. In the case of a transaction participant unexpectedly terminating, a pending change may prevent other processes from writing to the value until the pending change is resolved. Timeouts may be applied to resolve these and other similar situations. In an embodiment, the timeout period for the deadlock may be set based on the number of data elements modified by the transaction. The timeout value may increase proportionally to the number of data elements modified. The proportionality may be linear, exponential, asymptotic, and so on. The use of a proportional timeout may allow the transaction sufficient time to complete without triggering a timeout. Embodiments may employ this technique to support transactions involving large numbers of modified records.

A transaction id 208 field may be recorded to identify the transaction in which a pending version of a data element is to be committed. Embodiments may also retain transaction id 208 in the version information in order to permit subsequent roll backs of previously committed transactions. More generally, the transaction id 208 may also be used, in some embodiments, to reconstruct a state of one or more data elements as of a specified point in time.

A value 212 may indicate a current value for the data element. In some embodiments, value 212 may represent the entirety of the new version of the data. In other embodiments, value 212 may represent a delta from a previous version of the data, or from a known baseline version.

A status 214 may indicate that the first transaction has been committed. In some embodiments, a timestamp 210 field may be set to null, or marked with some other indicator, to indicate that the associated transaction has not yet been completed. A timestamp 210 may then be set, upon transaction completion, with a value indicative of the time at which the transaction completed. Additional values may be employed to indicate the manner in which the transaction terminated, such as being committed or being rolled back.

As depicted in FIG. 2, a second transaction operation 204 may involve altering the same data element as was affected by the first transaction. This may result in a second version of the data element 226. It may comprise a transaction id 216 corresponding to the second transaction, a timestamp 218, a value 220 for the second version of the data element 226, and a status 222. In the example depicted by FIG. 2, transaction operation 204 has initiated a transaction and modified a data element, but has not yet committed the transaction. Accordingly, status 222 may be set to an incomplete status.

A third transaction may be initiated and may involve the same data element. This is depicted by transaction operation 206. In response to the second transaction being in progress at the time at which the third transaction initiates an attempt to modify the data element, embodiments may detect a conflict 228. Embodiments may cause the attempt to modify the data element to fail as the attempt is made, rather than at a later point in time such as when the third transaction attempts to commit. In another embodiment, an additional version of the data element could be appended to the list of versions and be resolved at a later point in time. However, even in this case, embodiments may perform synchronous notification (i.e., notification at or soon after the time the attempt to modify the data element is made) that a conflict exists.

Figure 3:
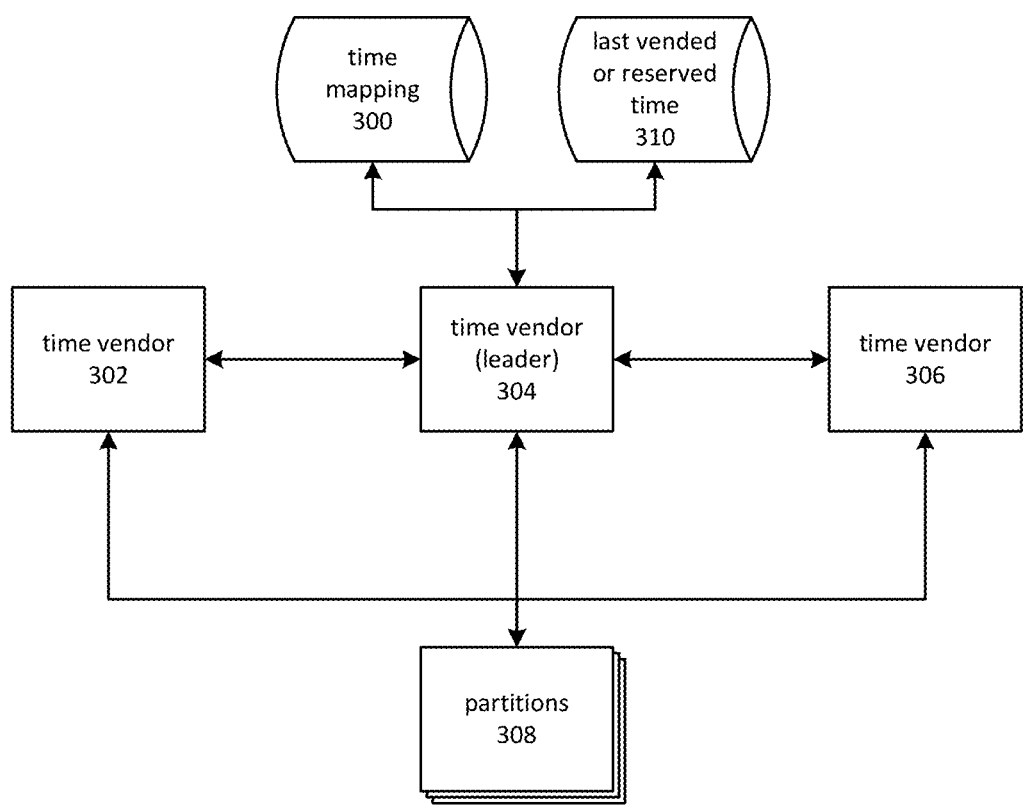
FIG. 3 depicts an embodiment of a system for vending time values for use within a distributed key-value database system.

FIG. 3 depicts an embodiment of a system for vending time values for use within a distributed key-value database system. One or more partitions 308 may request vended time values for use in recording versions of data elements. The requests may be issued to a time vendor 304 elected as a leader among time vendors 302, 304, and 306. A time vendor may be an executing or executable process, software module, circuitry, and various combinations thereof.

In some embodiments, a partition among partitions 308 may issue requests to obtain vended times from any of time vendors 302, 304, and 306. A time vendor not elected as leader may redirect vending requests to the currently elected leader. For example, in FIG. 3 time vendors 302 and 306 may redirect requests to time vendor 304 while it is the leader.

Embodiments may apply a minimum term length for a time vendor 304 elected as leader. For example, a minimum term length of two, four, or eight seconds might be applied. Embodiments may apply the term limit by conducting a new leader election process at the determined interval. Election of a new leader may be based on the operational status of the leader, possibly including health and performance information, scheduled maintenance and so forth.

Time values may be vended using a reservation model in which a block of time is reserved for the vendor. Leading time vendor 304 might have reserved for it a block of time from which it may vend time. A leading time vendor 304 may maintain a last vended or reserved time 310 on a storage device, such as a solid-state drive, that is resistant to data loss in the event of system failure. The last vended or reserved time 310 may be persisted to the storage device on a regular interval, such as an interval equal to or less than a minimum term limit for a leader node. Embodiments may also persist last vended or reserved time 310 in order to reserve a block of time from which it may vend time values. In the event of system failure leading to loss of the current leader 304, one of time vendors 302 and 304 may be elected as a new leader. The new leader may retrieve a last-vended or reserved time 310 from the storage device and resume vending time, beginning with a value greater than the last vended time, or greater than the last reserved time. The new time value may be equivalent to the last vended time plus the interval for leader election. Note that the term last-vended or reserved time may refer to the last time vended just prior to the storage operation, and does not necessarily refer to the last time vended in response to a request. Embodiments, in some cases, continue to provide new vended times without updating a persistent record of the last-vended time.

Vended time values may be indicative of actual time, but may not necessarily be equivalent to actual time. Vended time values may differ from actual time values due to encoding differences, including combination of values that are indicative of time with additional values not indicative of time, such as those identifying a time vendor, partition, or other information. Vended time values may also differ from actual time in that the vended time values may tend to drift away, in either direction, from actual time values. Embodiments may maintain a time mapping 300 for mapping between vended time values and actual time values. A time mapping 300 may be maintained in a database management system or using some other mechanism. Embodiments may use time mapping 300 to determine a vended time value corresponding to an actual time value. This may, for example, be performed in conjunction with an operation to retrieve a version of a data element that corresponds to a particular point in actual time.

Figure 4A:
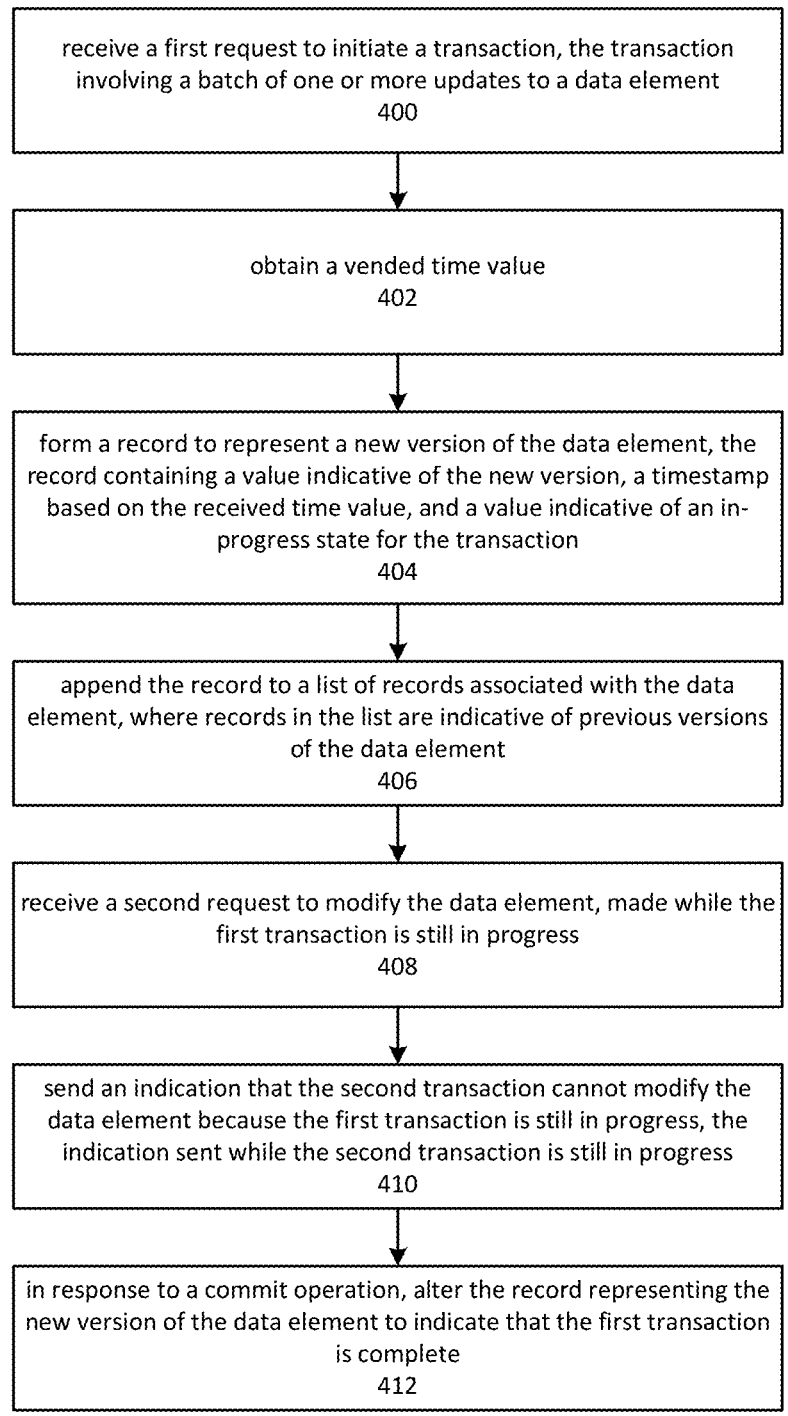
FIG. 4A depicts an embodiment of a process for processing transactions in a distributed key-value database with a level of conformance to ACID properties that may include full conformance.

FIG. 4A depicts an embodiment of a process for processing transactions in a distributed key-value database with a level of conformance to ACID properties that may include full conformance. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel. Embodiments of the depicted process may be implemented using various combinations of computer-executable instructions executed by a computing system, such as the computing systems described herein.

Operation 400 depicts receiving a first request to initiate a transaction involving a batch of one or more updates to a data element. A transaction may involve a series of inserts, updates, or delete operations affecting one or more data elements. Committing the transaction may make each of these changes permanent as a group, so that either all of the changes are made permanent or none are. Similarly, a transaction may be rolled back, so that none of the set of changes is made permanent. A transaction that has been initiated but not yet committed may be described as pending, uncommitted, in-progress and so forth.

At operation 402, embodiments may obtain a vended time value. A time value may be obtained from a time vendor elected as leader. In some embodiments, a partition may request a vended time value from a leading or non-leading time vendor. In the latter case, non-leading time vendors may redirect requests for vended time to the leading time vendor, and serve as an intermediary between a partition and a leading time vendor.

Operation 404 depicts an embodiment forming a record to represent a new version of a data element. The record may comprise a value indicative of the new version, a timestamp based on the vended time value, and a value indicative of an in-progress state for the transaction.

Operation 406 depicts an embodiment appending the record to a list of records associated with the data element. The list of records may comprise entries that are indicative of previous versions of the data element.

Operation 408 depicts an embodiment receiving a second request to modify a data element. The second request may be made in the context of a second transaction that is separate from the first transaction. The request may be made while the first transaction has yet to commit, so that the list of data element versions may contain an entry corresponding to the first transaction and indicating that it has not yet committed.

At operation 410, an embodiment may transmit an indication that the second transaction is not permitted to modify the data element because the first transaction has already modified the data element and is still in progress. The indication may be sent in response to the request to modify the data element in the context of the second transaction, and may be sent while the first and second transactions are still in progress.

Operation 412 depicts updating the record that represents the new version of the data element, as modified by the first transaction, to indicate that the first transaction is complete and has been committed. Embodiments may mark the record as complete in response to receiving an indication that the first transaction has been committed. Embodiments may respond to a transaction rollback by removing the entry or marking the entry as rolled-back.

In some cases and embodiments, pending changes may be marked with state information indicative of a pending commit state, subsequent to a request to commit a transaction and prior to the completion of the commit request. A conflict between an additional request to modify a data element and a pending change to the data element may be detected by a pending commit state being associated with a version of the data element. In some cases and embodiments, a conflict may be detected based on an uncommitted version of the data element being present when an additional request to modify the data element is located.

Embodiments may in some cases determine not to mark versions of data elements with an indicator that a commit operation is pending. This might be determined, for example, based on an indication that full conformance to ACID properties is not required. By not marking individual versions with an indication that a commit operation is pending, the commit operation may be done in an essentially constant time, where essentially constant means that the commit time does not increase in proportion to the number of records involved in the commit. On the other hand, doing so may increase the possibility that ACID properties may be violated.

Embodiments may, in some cases, incorporate assumptions concerning client behavior in conjunction with the commit method described in the preceding paragraph, which may be referred to as a "bypass" commit method. In conjunction with not marking versions of data element as being associated with a pending commit state, embodiments may presume that a process involved in a transaction will conform to a behavioral contract with regards to processing write operations. This step may include the client responding to write operation failures by performing at least one of the following actions: either reattempting the write operation, rolling back the transaction, or allowing the transaction to time out. Various aspects of the commit operation are further discussed below in view of FIG. 4C.

Figure 4B:
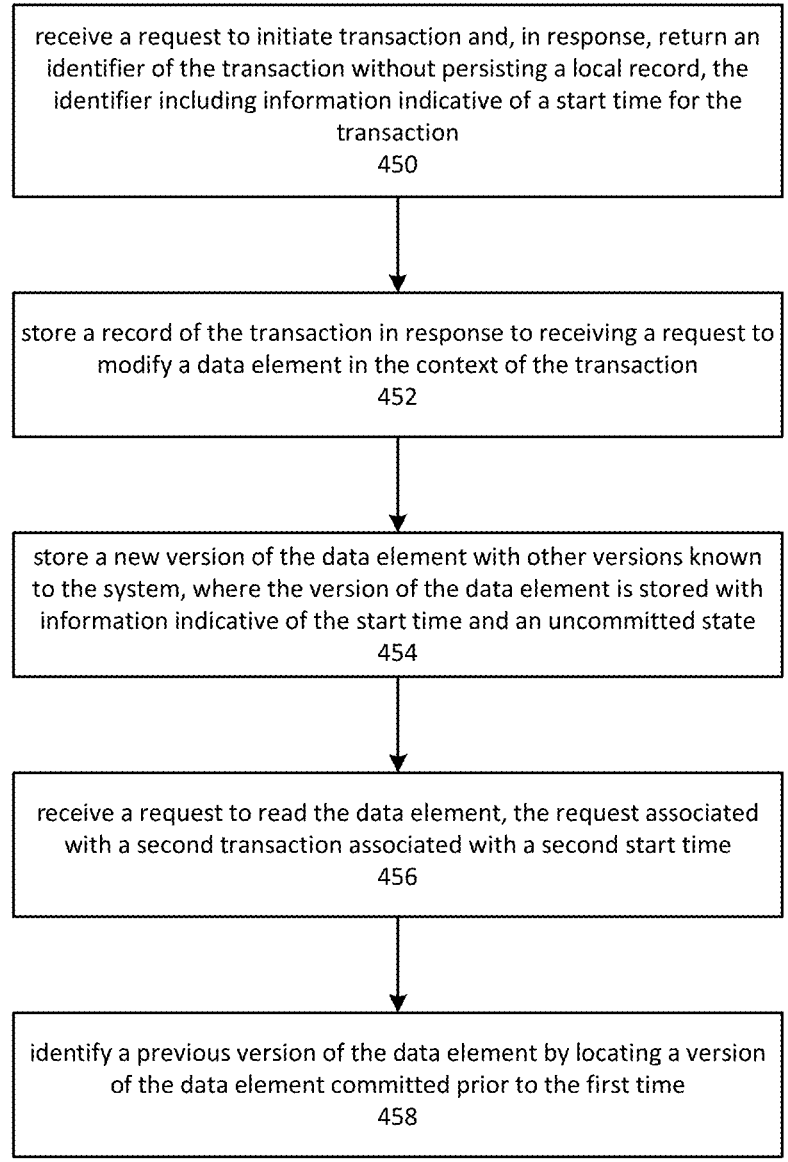
FIG. 4B depicts aspects of processing transactions in a distributed key-value database with a level of conformance to ACID properties that may include full conformance.

FIG. 4B depicts aspects of processing transactions in a distributed key-value database with a level of conformance to ACID properties that may include full conformance. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel. Embodiments of the depicted process may be implemented using various combinations of computer-executable instructions executed by a computing system, such as the computing systems described herein.

Operation 450 depicts receiving a request to initiate a transaction and, in response, transmitting an identifier of the transaction. The identifier may be indicative of the transaction and may include information indicating a start time for the transaction. The time may be a vended time value and need not directly correlate to calendar or real-world clock time. Embodiments may, in some cases, not persist information describing the transaction until a later time, such as when a request to modify a data element in the context of a transaction is received. By deferring recordation of the transaction, embodiments may achieve improved scalability or better performance, particularly for cases involving a high number of transactions, including a high number of read-only transactions or predominately read-based transactions. Embodiments may therefore persist a transaction record when a request to modify a data element is received, and elect not to persist a transaction record when requests to read a data element have been received.

Operation 452 depicts storing information indicative of the transaction upon receiving a request to modify a data element. The information may be stored on one or more storage devices associated with a database management system maintaining a collection of tables on the storage devices. The request may include the first identifier of the first transaction. As depicted by operation 454, embodiments may process the request by storing a new version of the data element. The new version of the data element may be stored in a table or other data structure, and may comprise all other versions of the data element presently known to the system. Embodiments may retain a sliding window of prior versions, earlier versions not in the window would no longer be considered known to the system. A version of the data element may be stored with information indicating the time of the transaction to which the version is related, i.e., the transaction in the context of which the modification to the data element was made. The time may be supplied as a component of a transaction identifier supplied in the request to modify the data element. The use of this technique may be used, in various embodiments, to minimize lookups in data structures other than those housing the previous versions, and accordingly may in some cases contribute to improved efficiency. In some cases and embodiments, a version of the data element may be associated with a time value indicative of the time the version of the data element was modified.

Operation 456 depicts receiving a second request, the second request pertaining to reading the data element. The request may comprise a second identifier indicative of a second transaction. The second identifier may comprise information indicating the start time of the second transaction. Note that the term "start time" refers generally to an indication of the sequence of a transaction relative to other transactions, and may in some cases not correspond directly to calendar or wall-clock time. It may, for example, be a sequence identifier.

As depicted by operation 458, embodiments may identify a version of the data element to use in responding to the request to read the data element. An embodiment may identify a version of the data element to return based at least in part on locating a version of the data element that was committed prior to the start time of the first transaction. Embodiments may identify a version of the data element that is associated with a time that is subsequent to the start time of the second transaction (i.e., a start time of the transaction associated with the read request) and is in a committed state. A version of the data element associated with an uncommitted state may be returned if the read request is associated with the same transaction. In various embodiments, only one uncommitted version of the data element may be allowed. A request to modify a data element for which an uncommitted version already exists may be identified as a conflict and may result in an exception, error code, or other status notification.

Embodiments may maintain an index for versions of the data element. The index may comprise entries for all committed versions of the data element, or for all versions including an uncommitted version or uncommitted versions. Requests to read data may be processed based at least in part on the index, which may allow efficient identification and location of a version of an element that should be used to respond to the request to read data. An entry in the index may comprise a start time or modification time and a mapping to a version of the data element.

Embodiments may utilize database structures, such as tables and indexes, in conjunction with the practice of various aspects of the present disclosure. In an embodiment, a table structure may be employed to store versions of a data element. A relation may be established between a table containing transaction data and entries in a table storing versions of data elements.

Figure 4C:
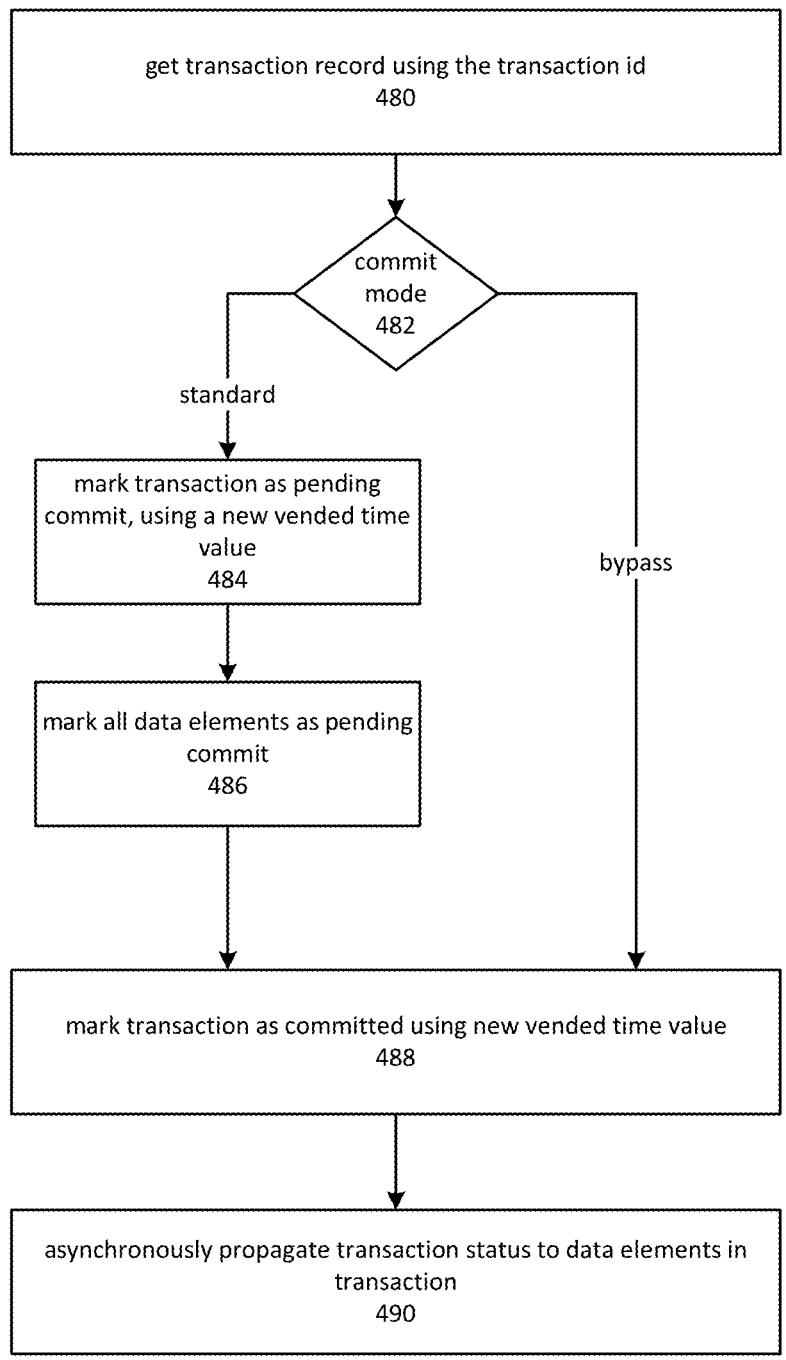
FIG. 4C is a flowchart depicting various aspects of committing a transaction using the various techniques presented herein.

FIG. 4C is a flowchart depicting various aspects of committing a transaction using the various techniques presented herein. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel. Embodiments of the depicted process may be implemented using various combinations of computer-executable instructions executed by a computing system, such as the computing systems described herein.

As depicted by operation 480, embodiments may begin to commit a pending transaction by obtaining a record that corresponds to the transaction. The record may be obtained using a transaction identifier supplied in a request to commit a pending transaction.

Operation 482 depicts identifying a commit mode that may be used to commit the transaction. As noted, some embodiments may employ a bypass commit mode where various server side operations may be omitted when other various behaviors by the client may be assumed. Embodiments may receive an assurance that a client will perform certain steps in response to a failed write operation. These steps may comprise initiating a rollback of the related transaction, or retrying the failed write. This approach may improve consistency of the data with respect to in-flight write operations that cannot be processed due to conflicts or other reasons. The assurance may be provided programmatically. For example, a client might supply a commit mode indicator upon initiation of the transaction, or at some other time. The assurance might also be supplied as a configuration parameter of the client or server.

Operation 484 depicts marking the record of the transaction as being associated with a pending commit state. A pending commit state should be distinguished from a pending state for the transaction, as the later pertains to the transaction being active. A pending commit state refers to the process of performing operations needed to finalize write operations performed while the transaction was active.

Operation 486 depicts marking all data element versions affected by the transaction with information indicating that the associated transaction is in a pending commit state. This may be a comparatively lengthy operation if a number of data elements have been affected by the transaction. However, this operation may be bypassed if it may be presumed that the client will, in response to an error on write, either reattempt the write operation or cause the associated transaction to be rolled back in its entirety.

As depicted by operation 488, embodiments may mark the transaction record as being in a committed state. The record of the transaction may also be updated to reflect a time that the commit completed, using an additional vended time value. The corresponding version information for each data element affected by the transaction may then be updated to reflect the committed state, as depicted by operation 490. This operation may be performed asynchronously.

Figure 5:
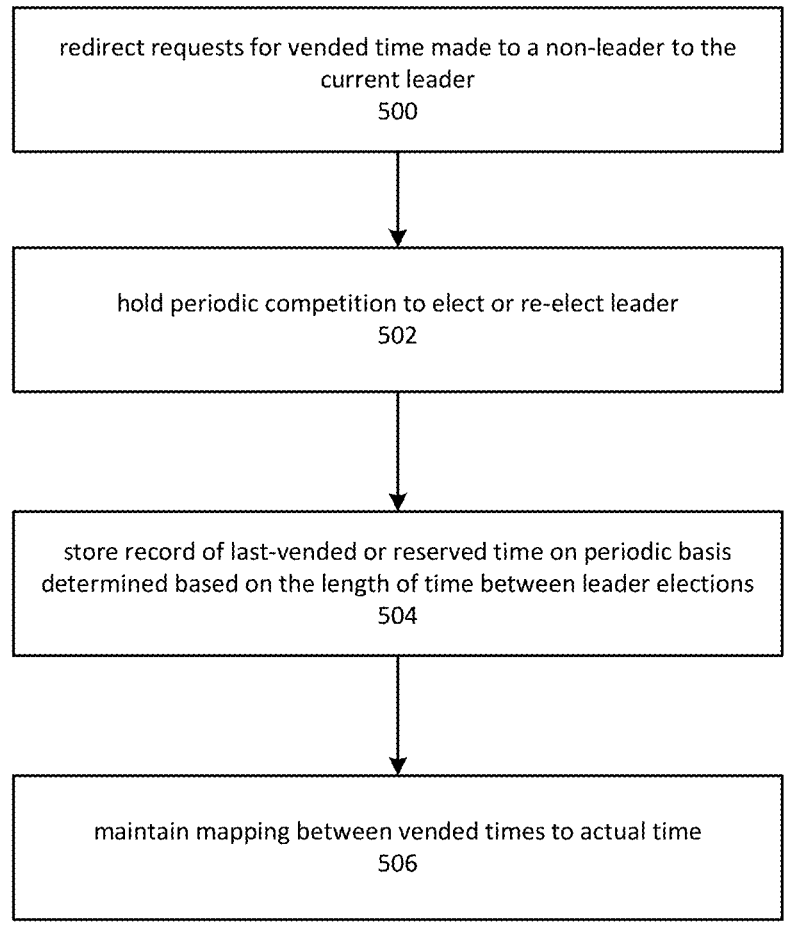
FIG. 5 is a flowchart depicting an embodiment of a process for operating a distributed group of time vendors for use with performing transactions in a distributed key-value database with a degree of conformance to ACID properties.

FIG. 5 depicts an embodiment of a process for operating a distributed group of time vendors for use with performing transactions in a distributed key-value database with a degree of conformance to ACID properties. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 500 depicts redirecting requests for vended time that were originally made to a non-leading time vendor. Requests for vended time may originate, for example, from a partition that is processing a request to alter a data element. Time vendors may be hosted on computing nodes not used to host partitions, or on computing nodes also used to host partitions. A non-leading time vendor may act as an intermediary between a partition and a currently elected time vendor.

As depicted by operation 502, in various embodiments there may be a period competition between time vendors to determine which will serve in the leader role for at least a threshold amount of time. Election may be based on a variety of factors, such as system availability, system performance, maintenance schedules, and so on. Embodiments may conduct the election on a periodic basis whose length may be configured based on various factors, such as system performance. The length of time between elections may serve as a basis for performing other periodic operations, such as persisting a last-vended time to disk.

Operation 504 depicts storing a record of the last-vended time, or the last reserved time, on a periodic basis. As just noted, this may be performed on a frequency that is based in part on the length of time between leader elections. Upon recovery from system failure, the last vended time or the last reserved time may be retrieved from storage. Note that the term last vended or reserved time may refer to the last time vended or reserved just prior to the storage operation, and does not necessarily refer to the last time vended in response to a request. Embodiments, in some cases, continue to provide new vended times without updating a persistent record of the last-vended time.

As depicted by operation 506, embodiments may maintain a mapping between vended time and actual times. As used herein, the term actual time may refer to "real-world" or "calendar" time. Embodiments may perform queries and other operations based on actual time. In order to locate records corresponding to a particular point in time, embodiments may utilize a mapping between actual time and vended time to locate versions of data elements corresponding to a particular point in time.

Figure 6:
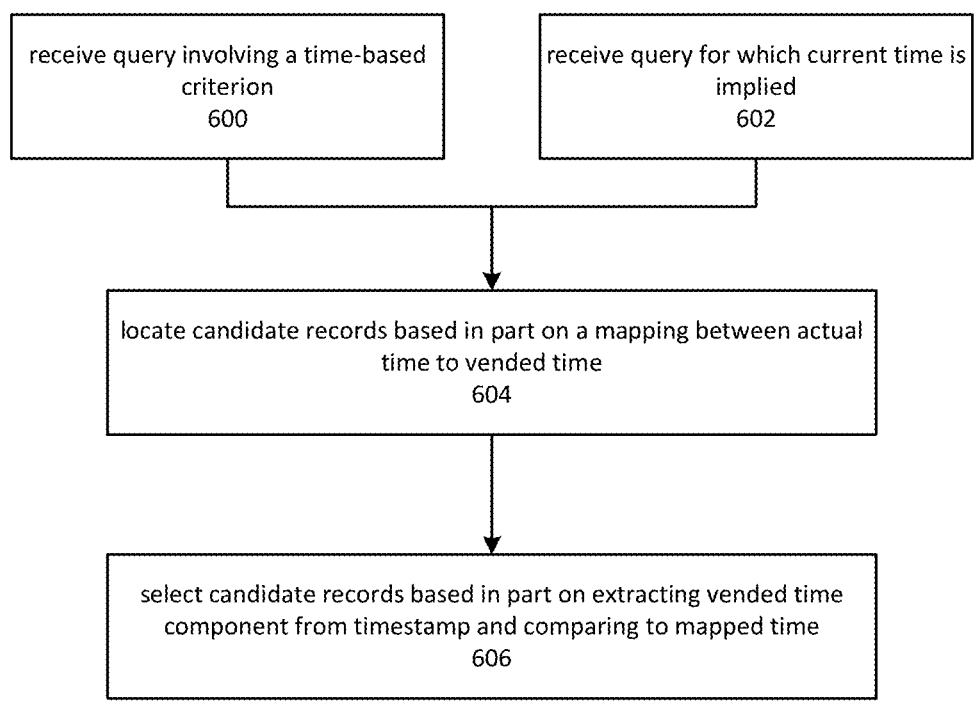
FIG. 6 is a flowchart depicting an embodiment of a process for performing queries in a distributed key-value database system.

FIG. 6 is a flowchart depicting an embodiment of a process for performing queries in a distributed key-value database system. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operations 600 and 602 depict an embodiment receiving information describing a query that involves time. In operation 600, an embodiment may receive information describing a query that involves an explicit time-based criterion. For example, a query might be applied to return the results of a query as of a specific date and time. Queries may also imply a time value. Operation 602 depicts receiving information that describes a query for which the current time applies implicitly. Such queries may be thought of as implicitly belonging to a new transaction initiated as of the time at which the query was received or is being processed.

Both types of queries, as well as other time-based queries not explicitly depicted in FIG. 6, may be processed in a similar fashion. Embodiments may perform operation 604 to locate candidate records based on the time values explicitly or implicitly supplied by the query being processed. These time values may initially be in the form of actual time, which is to say they may be expressed in terms of real-word time values. Operation 604 depicts locating candidate records based in part on an index or other structure containing a mapping between actual time values and vended time values.

At operation 606, an embodiment may select or identify candidate records based in part on extracting vended time components from timestamps maintained in data element version information. A timestamp may be comprised of a bit region containing vended time information, which may be extracted and compared to a target vended time. The target vended time may have been obtained in operation 604 as a result of mapping between actual time and vended time.

Embodiments may process a query by applying a set of filtering criteria to one or more data elements. Application of the time-based criteria described in operations 600-604 may be considered as a precursor to filtering, because it may involve using time to select the particular version of each data element to which the filter will be applied. Operation 606 may therefore involve examination of the versions of each data element to determine which version corresponds to the time explicitly or explicitly supplied by the query. Once the appropriate version of an element has been applied, filtering criteria may be applied to it.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices—such as solid-state drives.

Figure 7:
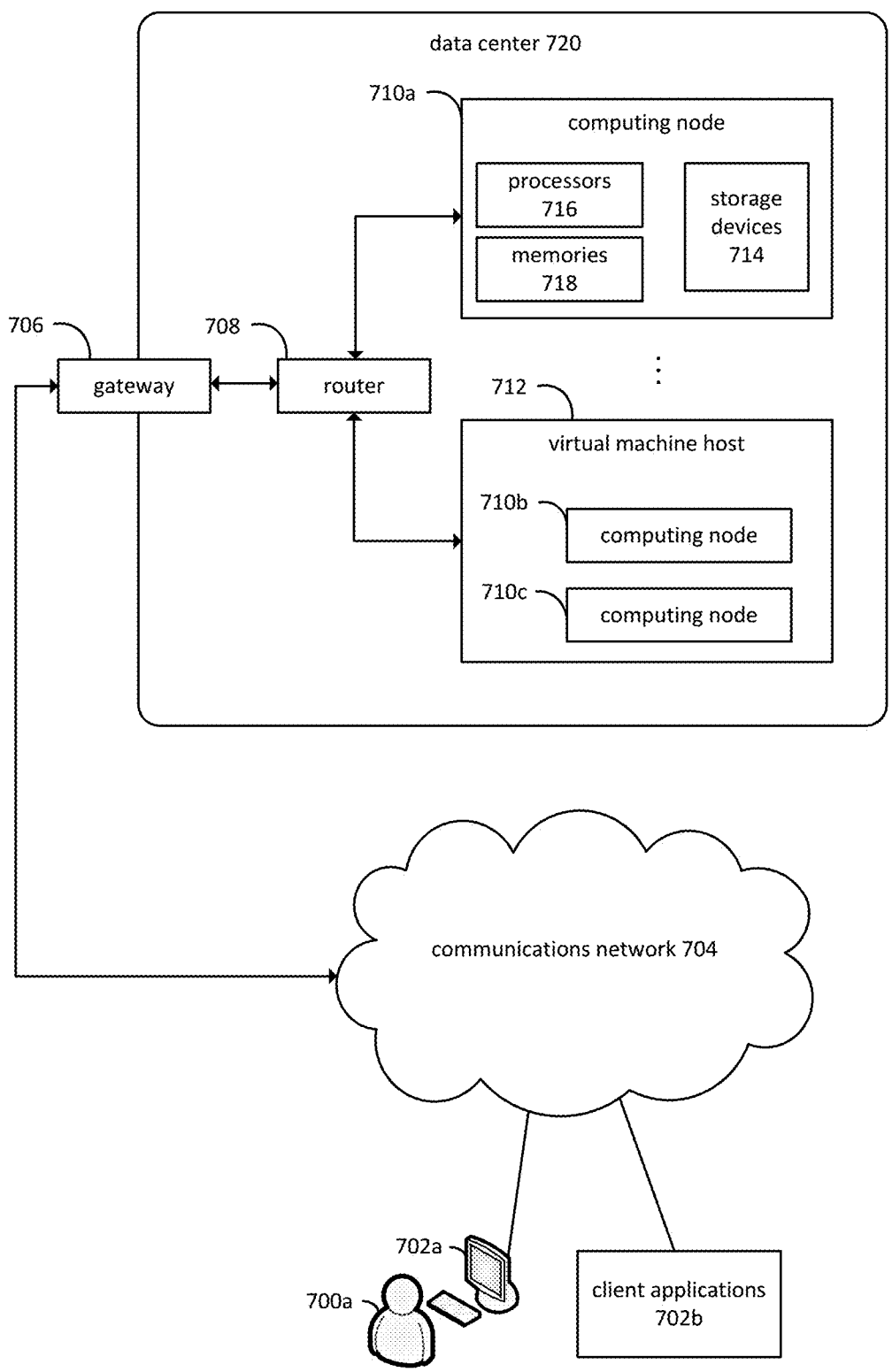
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718, and one or more storage devices 714. Processes on computing node 710a may execute in conjunction with an operating system or alternatively may execute as a bare-metal process that directly interacts with physical resources, such as processors 716, memories 718 or storage devices 714.

Computing nodes 710b and 710c are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
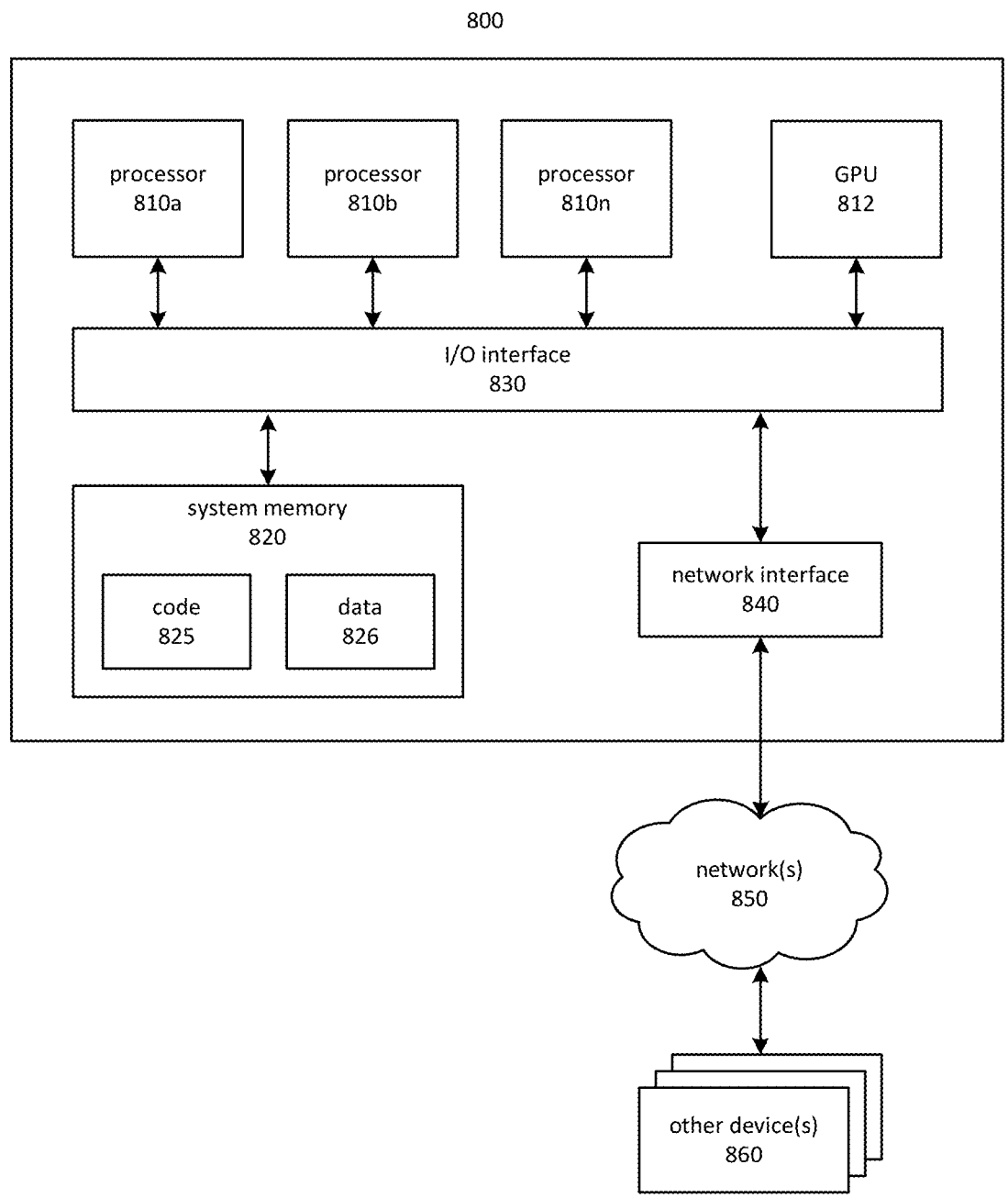
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b, and/or 810n (which may be referred herein singularly as a processor 810 or in the plural as the processors 810) coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic, or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone.

Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A database management system comprising:
one or more computing nodes, comprising one or more processors;
one or more storage devices; and
one or more memories comprising computer-readable instructions that, upon execution by the one or more computing nodes, cause the system at least to:
transmit, in response to initiating a first transaction, a first identifier of the first transaction, the first identifier based at least in part on a first start time for the first transaction, wherein the system defers storage of a record of initiating the first transaction until a first request to modify a data element in a context of the first transaction has been received;
receive the first request to modify the data element, the first request comprising the first identifier, the first identifier indicating that the first request is associated with the first transaction;
in response to receiving the first request to modify the data element, store the record of initiating the first transaction on the one or more storage devices and add a first version of the data element to a plurality of versions of the data element stored on the one or more storage devices, the plurality of versions comprising a second version of the data element, the second version in a committed state;

receive a second request to read the data element, the second request comprising information indicative of a second start time of a second transaction; and identify the second version of the data element, in the plurality of versions of the data element, for responding to the second request, the second version of the data element identified based at least in part on the second request being associated with a time prior to the first start time and on the second version of the data element being associated with the committed state.

2. The system of claim 1, further comprising one or more memories comprising computer-readable instructions that, upon execution by the one or more computing nodes, cause the system at least to:

maintain an index comprising a plurality of transaction start times, stored within version information entries, including the second start time and information indicative of the second version of the data element; and identify the second version of the data element based at least in part on the index.

3. The system of claim 1, further comprising one or more memories comprising computer-readable instructions that, upon execution by the one or more computing nodes, cause the system at least to:

determine to update the first version of the data element with information indicative of a pending commit state, the determination based at least in part on an assurance that a client of the first transaction will, in response to a failed write, rollback the first transaction or retry the failed write.

4. The system of claim 1, wherein the plurality of versions of the data element is stored on the one or more storage devices and comprises any additional versions of the data element that are known to the system.

5. The system of claim 1, further comprising one or more memories comprising computer-readable instructions that, upon execution by the one or more computing nodes, cause the system at least to:

in response to receiving information indicative of committing the first transaction, store data indicative of the first version of the data element being in a pending commit state; and identify a conflict between a third request to read the data element, the conflict identified based at least in part on the third request being associated with a third transaction initiated subsequent to the start time of the first transaction and on the pending commit state associated with the first version of the data element.

6. A computer-implemented method comprising:

transmitting a first identifier of a first transaction, the first identifier indicative of the first transaction and comprising information based on a first time, wherein information indicative of an initiated state of the first transaction is not persisted in response to initiating the first transaction;

storing, in response to receiving a first request to modify the data element in a context of the first transaction, a first version of the data element with the information indicative of an initiated state of the first transaction, including information indicative of the first time and information indicative of an uncommitted state in the first transaction of the first version of the data element, wherein the first version of the data element is stored with a second version of the data element, the second version being in a committed state; and processing a second request to read the data element, the second request comprising information indicative of a second transaction and a second time, wherein processing the second request comprises identifying the second version of the data element based at least in part on the second time being prior to the first time and on the second version of the data element being in the committed state.

7. The computer-implemented method of claim 6, further comprising:

maintaining an index of a plurality of transaction start times, stored within version information entries, including the second time; and identifying the second version of the data element based at least in part on the index.

8. The computer-implemented method of claim 6, wherein commit time is essentially constant with respect to number of data elements modified in association with the first transaction.

9. The computer-implemented method of claim 6, wherein the first version of the data element and the second version of the data element are stored with plurality of versions of the data element, the plurality of versions comprising any additional versions of the data element.

10. The computer-implement method of claim 9, wherein the plurality of versions are maintained in a table structure.

11. The computer-implemented method of claim 6, further comprising:

storing, in response to receiving information indicative of committing the first transaction, data indicative of the first version of the data element being in a pending commit state; and identifying a conflict between a third request to read the data element, the conflict identified based at least in part on the third request being associated with a third transaction initiated subsequent to the first time and on the pending commit state associated with the first version of the data element.

12. The computer-implemented method of claim 6, further comprising:

determining a timeout period for the first transaction, the timeout period proportional to a number of data elements modified in association with the first transaction.

13. The computer-implemented method of claim 6, further comprising:

identifying a conflict between a third request to modify the data element, based at least in part on the first version of the data element being in the uncommitted state.

14. A non-transitory computer-readable storage medium comprising instructions that, upon execution by one or more computing devices, cause the one or more computing devices at least to:

transmit, in response to initiating a first transaction, a first identifier of a first transaction, the first identifier indicative of the first transaction and a first time, wherein a record comprising information indicative of the first transaction having been initiated is not stored in response to initiating the first transaction;

store, in response to receiving a first request to modify the data element in a context of the first transaction, the record, and a first version of the data element with information indicative of the first time and information indicative of an uncommitted state in the first transaction of the first version of the data element, wherein the first version of the data element is stored with a second version of the data element, the second version being in a committed state; and process a second request to read the data element, the second request comprising information indicative of a second transaction and a second time, wherein processing the second request comprises identifying the second version of the data element based at least in part on the second time being prior to the first time and on the second version of the data element being in the committed state.

15. The non-transitory computer-readable storage medium of claim 14, comprising further instructions that, upon execution by the one or more computing devices, cause the one or more computing devices to at least:

maintain an index of a plurality of transaction start times, stored within version information entries, including the second time; and identify the second version of the data element based at least in part on the index.

16. The non-transitory computer-readable storage medium of claim 14, comprising further instructions that, upon execution by the one or more computing devices, cause the one or more computing devices to at least:

determine to update the first version of the data element with information indicative of a pending commit state, the determination based at least in part on information indicative of an assurance that a client of the first transaction will, in response to a failed write, rollback the first transaction or retry the failed write.

17. The non-transitory computer-readable storage medium of claim 14, wherein the first version of the data element and the second version of the data element are stored with plurality of versions of the data element, the plurality of versions comprising any additional versions of the data element.

18. The non-transitory computer-readable storage medium of claim 14, comprising further instructions that, upon execution by the one or more computing devices, cause the one or more computing devices to at least:

store, in response to receiving information indicative of committing the first transaction, data indicative of the first version of the data element being in a pending commit state; and identify a conflict between a third request to read the data element, the conflict identified based at least in part on the third request being associated with a third transaction initiated subsequent to the first time and on the pending commit state associated with the first version of the data element.

19. The non-transitory computer-readable storage medium of claim 14, comprising further instructions that, upon execution by the one or more computing devices, cause the one or more computing devices to at least:

determine a timeout period for the first transaction, the timeout period proportional to a number of data elements modified in association with the first transaction.

20. The non-transitory computer-readable storage medium of claim 14, comprising further instructions that, upon execution by the one or more computing devices, cause the one or more computing devices to at least:

identify a conflict between a third request to modify the data element, based at least in part on the first version of the data element being in the uncommitted state.

* * * * *